United States Patent [19]

Takaoka

[11] Patent Number: 4,924,324

[45] Date of Patent: May 8, 1990

[54] FACSIMILE MACHINE WHICH PREVENTS THE LOSS OF RECORDED DATA IN MULTIPLE CUT SHEET REPORTS

[75] Inventor: Tatsuo Takaoka, Isehara, Japan

[73] Assignee: Ricoh Company Ltd., Tokyo, Japan

[21] Appl. No.: 199,847

[22] Filed: May 27, 1988

[30] Foreign Application Priority Data

May 28, 1987 [JP] Japan .................................. 62-129815

[51] Int. Cl.$^5$ .......................... H04N 1/32; H04N 1/40
[52] U.S. Cl. .................................... 358/468; 358/434; 358/449
[58] Field of Search ............... 358/434, 437, 439, 468, 358/498, 400, 442, 443, 448, 449, 451, 494

[56] References Cited

U.S. PATENT DOCUMENTS

| | | | |
|---|---|---|---|
| 4,631,596 | 12/1986 | Yaguchi | 358/449 |
| 4,679,093 | 7/1987 | Yaguchi | 358/449 |
| 4,695,898 | 9/1987 | Ishikawa et al. | 358/449 |
| 4,712,139 | 12/1987 | Kato | 358/439 |
| 4,723,172 | 2/1988 | Matsumoto | 358/498 |
| 4,731,658 | 3/1988 | Koseki | 358/451 |

Primary Examiner—James J. Groody
Assistant Examiner—Randall S. Svihla
Attorney, Agent, or Firm—Oblon, Spivak, McClelland, Maier & Neustadt

[57] ABSTRACT

The present device is a report outputting system of a facsimile machine provided with a laser beam printer using cut sheets of recording paper. The size of cut sheets of recording paper set in position in the laser beam printer is detected and the maximum number of character lines which may be recorded on each of the cut sheets of recording paper with predetermined top and bottom margins is determined. A report of predetermined information, such as history of transmission and reception operations of the facsimile machine, is recorded on one or more of the cut sheets of recording paper. On each sheet is up to the thus determined maximum number of character lines. A system controller monitors the number of character lines recorded on each cut sheet and controls the system to insure no information is lost when recording multiple page reports.

4 Claims, 4 Drawing Sheets

FACSIMILE MACHINE WHICH PREVENTS THE LOSS OF RECORDED DATA IN MULTIPLE CUT SHEET REPORTS

BACKGROUND OF THE INVENTION

1. Field of the Invention

This invention generally relates to a facsimile machine and in particular to a facsimile machine using cut sheets of recording paper.

2. Description of the Prior Art

In general, many facsimile machines use a thermosensitive type recording device for recording an image since such a thermosensitive recording device is low at running cost, does not produce much noise and has a relatively long service life. Besides, in such a facsimile machine employing a thermosensitive recording device, use is typically made of a lengthy sheet of thermosensitive paper in the form of a roll so as to allow to make the entire structure compact in size. However, thermosensitive recording paper is poor in the ability to preserve a recorded image and thus it cannot be stored as a file. For this reason, in order to store a recorded image in a file, the image recorded on such thermosensitive recording paper must first be copied on copy paper by a plain paper copier or the like and such copy paper must be stored in a file, which is cumbersome in most cases.

Under the circumstances, some of the recent facsimile machines use an electrophotographic recording device which is excellent in the quality of a recorded image and the ability of preserving a recorded image, such as a laser beam printer. In facsimile machines using such a recording device, since a recorded image is well preserved and the size of recording paper may be maintained at a predetermined size, it is extremely convenient when recorded images are to be filed.

Moreover, some of the recent facsimile machines are so structured to output a report including various information, such as use history of the facsimile machine and notification of the result of transmission, so as to allow to monitor and manage the use history of the facsimile machine and to secure proper transmission of image information. Such a report is typically output from a facsimile machine with various information for a predetermined time period recorded on recording paper in a predetermined format, and thus it could be quite long in some cases. In a recording device using an electrophotographic process, use is typically made of a cut sheet of recording paper, and thus the amount or length of data to be recorded on a single cut sheet of recording paper is limited. Accordingly, when an extremely long report is to be recorded, it is recorded on two or more cuts sheet of recording paper as shown in FIG. 6. In this case, a leading margin W is provided at the leading end of the first cut sheet of recording paper P1 and the contents of the report to be output are partially recorded on the first cut sheet of recording paper P1 over the remaining length L1 thereof and then the remaining portion of the contents of the report to be output is recorded on the second cut sheet of recording paper P2 over length L2 from the leading end thereof.

In general, in recording an image on recording paper by such a recording device, the image is recorded line by line. Each of the characters or letters defining the contents of the report has a dot pattern of a matrix format. Thus, a single character line recorded on recording paper is comprised of a predetermined number of recording lines. Thus, when the contents of a report are recorded as divided between two cut sheets of recording paper as described above, there may arise a case in which one character line is recorded as divided between the two cut sheets of paper, which is disadvantageous because the divided character line is difficult to read and some information may be lost.

SUMMARY OF THE INVENTION

In accordance with the present invention, when a report of predetermined parameters relating to the operation of a facsimile machine is to be output, the maximum number of character lines which can be recorded on a cut sheet of paper set in the facsimile machine is determined and the report is recorded on one or more of the cut sheets of paper such that each cut sheet of paper is recorded not to exceed the maximum number of character lines. In one embodiment, the predetermined parameters relating to the operation of a facsimile machine include a use history of the facsimile machine. And, thus, in accordance with the present invention, even if a report of predetermined parameters to be output is extremely long, it can be properly recorded on cut sheets of paper without losing any information and in a format easy to read. Thus, such a report is not required to be output whenever the contents of such a report has reached the maximum amount of data to be recorded on a single cut sheet of paper.

It is therefore a primary object of the present invention to obviate the disadvantages of the prior art as described above and to provide an improved facsimile machine using cut sheets of recording paper.

Another object of the present invention is to provide an improved facsimile machine capable of outputting a report containing predetermined information regarding the operation of a facsimile machine using cut sheets of recording paper.

A further object of the present invention is to provide an improved facsimile machine provided with a recording device using cut sheets of recording paper, in which a report of predetermined monitoring information may be recorded on a cut sheet of paper in a predetermined format.

Other objects, advantages and novel features of the present invention will become apparent from the following detailed description of the invention when considered in conjunction with the accompanying drawings.

DESCRIPTION OF THE PREFERRED EMBODIMENTS

Figure 1:
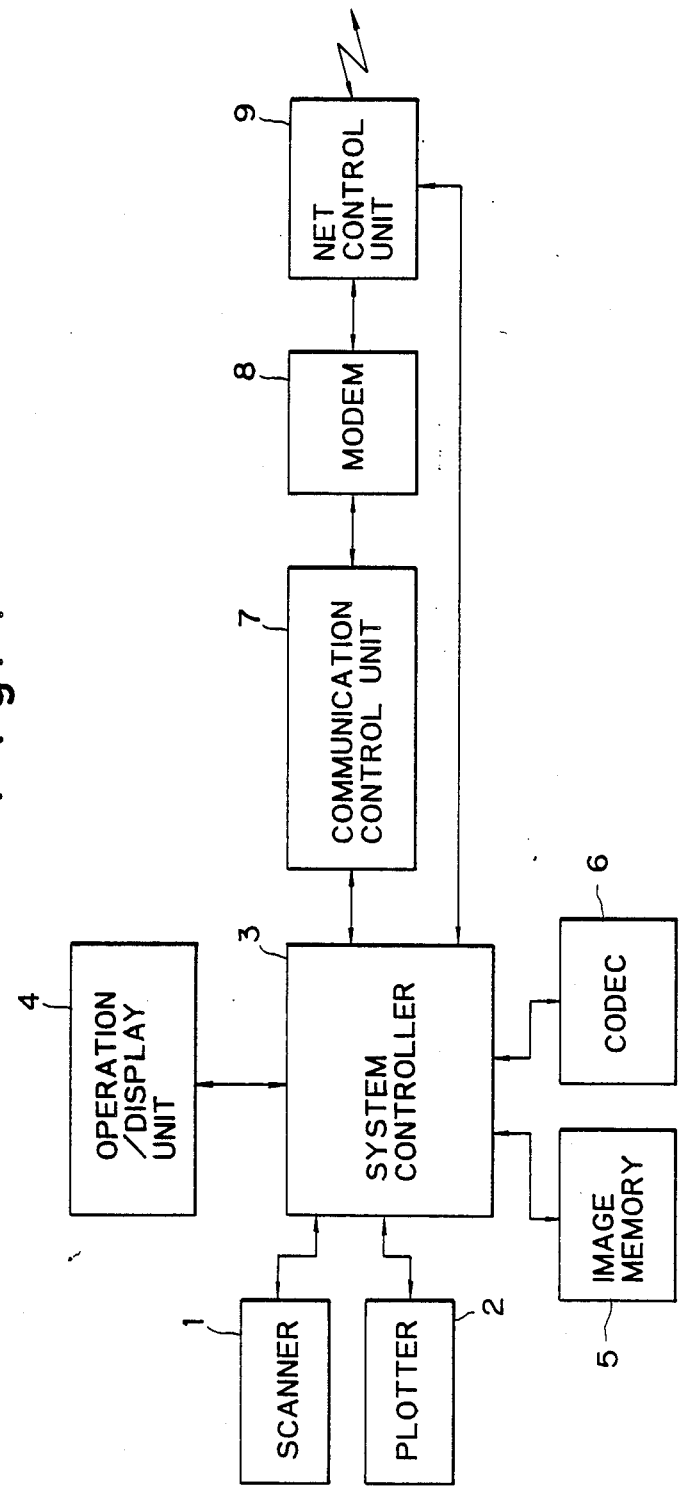
FIG. 1 is a block diagram showing the overall structure of a facsimile machine constructed in accordance with one embodiment of the present invention.

Referring now to FIG. 1, there is schematically shown a facsimile machine constructed in accordance with one embodiment of the present invention. As shown, the present facsimile machine includes a scanner 1 for optically reading an original image at a predetermined resolution and a plotter 2 for recording an image on one or more cut sheets of recording paper at a predetermined resolution. In the present embodiment, the plotter 2 is comprised of a laser beam printer. Also provided in the present facsimile machine is a system controller 3 in charge of the control of each component of the present facsimile machine and also of an internal process. An operation/display unit 4 is provided with various operational keys and display devices and serves as an interface between the operator and the present facsimile machine to thereby allow the operator to input various commands for the operation of the present facsimile machine.

The present facsimile machine also includes an image memory 5 for storing image information and a code 6 for compressing an image signal by compressing or for restoring the compressed image data to the original uncompressed image signal by decoding. In addition, the present facsimile machine further includes a communication control unit 7 for carrying out a predetermined facsimile communication control procedure, a MODEM 8 for carrying out a predetermined modulating and demodulating process and a net control unit 9 for establishing a connection between the present facsimile machine and a telephone network. It is to be noted that the net control unit 9 is equipped with an automatic call placing and receiving function.

Figure 2:
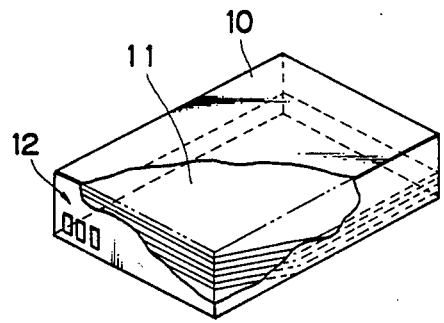
FIG. 2 is a schematic illustration showing one example of a paper feed cassette suitable for use in a facsimile machine of FIG. 1.

A stack of cut sheets of recording paper 11 is stored in the plotter 2 as contained in a paper feed cassette 10 as shown in FIG. 2. The paper feed cassette 10 is provided with a paper size indicator 12 for indicating the size of the cut sheets of recording paper 11 contained therein. Thus, based on the information supplied from the paper size indicator 12, the plotter 2 determines the size of the cut sheets of recording paper 11 stored in the paper feed cassette 10. And, the information of the thus determined size of the cut sheets of recording paper 11 is supplied to the system controller 3.

With the above-described structure, the system controller 3 stores therein various operational information indicating various operations of the present facsimile machine, such as a result of a transmission operation commanded by the operator, a result of an image reception operation and a result of a storing operation for storing image information into the image memory 5, and various setting information, such as registration of one-touch dial numbers, and these information is output in the form of a report as recorded on one or more cut sheets of recording paper 11 at a predetermined timing. Such a report typically has a predetermined format in accordance with its kind and is provided with a title, names of items and graphic/character lines for indicating the corresponding information. It is to be noted that the pattern information (e.g., 7 dots in the horizontal direction and 9 dots in the vertical direction) which represents each graphic pattern/character is produced from a character generator provided in the present facsimile machine.

Figure 3:
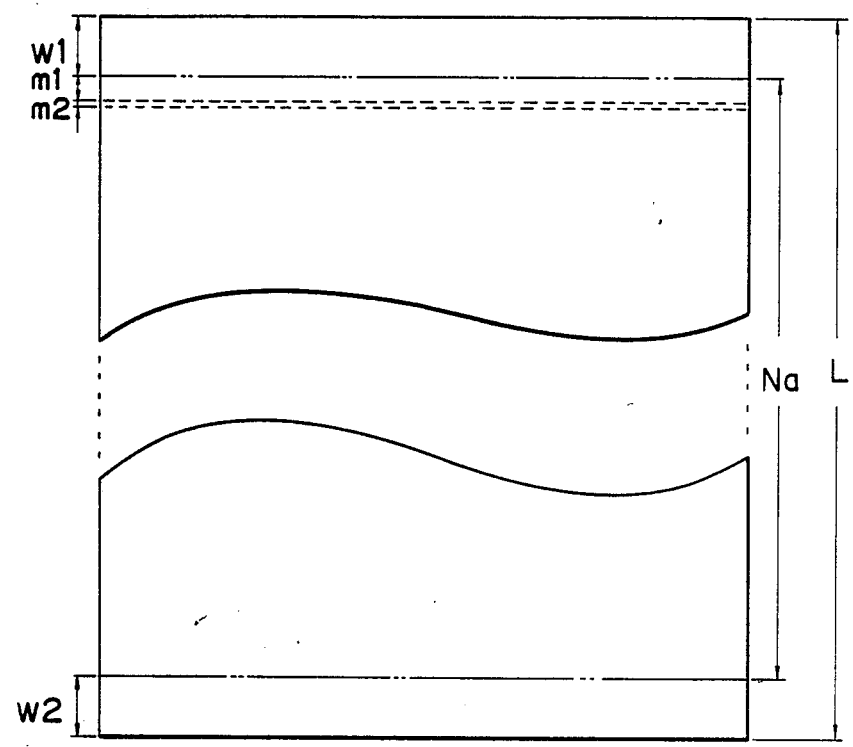
FIG. 3 is an illustration showing an example of format in outputting a report of predetermined parameters of the operation of the facsimile machine of FIG. 1.
Figure 6:
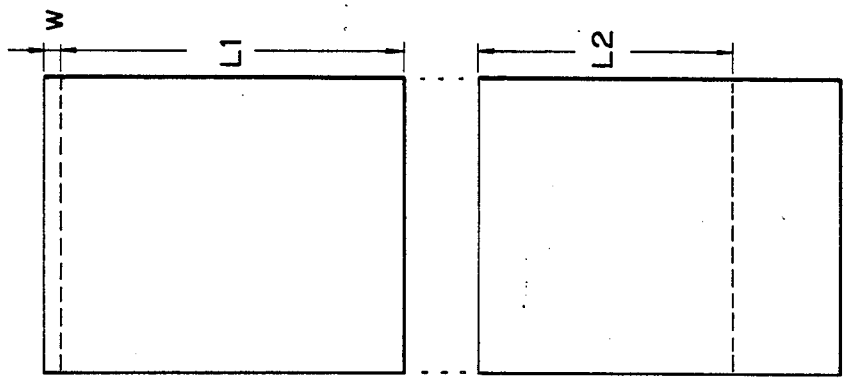
FIG. 6 is an illustration showing a prior art example of a report output of a facsimile machine.

One example of the page format for recording each report on a cut sheet of recording paper 11 is schematically illustrated in FIG. 3. In this case, a leading end margin w1 (having the unit of pixel line number) is provided at the leading end portion of a cut sheet of recording paper 11 having L number of pixel lines in its lengthwise direction, and Na number of character lines (having the unit of character lines) which represent the contents of the report follow the leading end margin w1. In addition, a trailing end margin w2 (having the unit of pixel line number) is defined at the trailing end portion of the cut sheet of recording paper 11.

In the case where one graphic pattern or character (letter) is defined by 7 dots horizontally and 9 dots vertically, a single character line includes 9 consecutive pixel lines for recording graphic patterns or characters and 3 pixel lines to provide a space to be separated away from the next following character line. As a result, in this embodiment, a single character line includes in total 12 pixel lines. That is, when a report is to be recorded under the control of the system controller 3, the image information of the leading end margin w1 is first formed and then transferred to the plotter 2 to have it recorded on a cut sheet of recording paper 11, and then the contents of the report which include Na number of character lines are formed and transferred to the plotter 2 to thereby have the contents of the report for the first cut sheet of recording paper 11 (first page) recorded.

If all of the contents of one report have not been recorded on a single cut sheet of recording paper 11, the image information of each of the trailing end margin w2 for the first cut sheet of recording paper 11 and the leading end margin w1 for the second cut sheet of recording paper 11 is formed and transferred to the plotter 2, whereby the trailing end margin w2 of the first cut sheet and the leading end margin w1 of the second cut sheet are recorded. Then, similarly with the first cut sheet (first page), the information of the report for the second cut sheet (second page) is formed and transferred to the plotter 2, whereby the information for the second cut sheet is recorded on the second cut sheet. The above-described operation is repeated until all of the contents of the report have been recorded.

Figure 4:
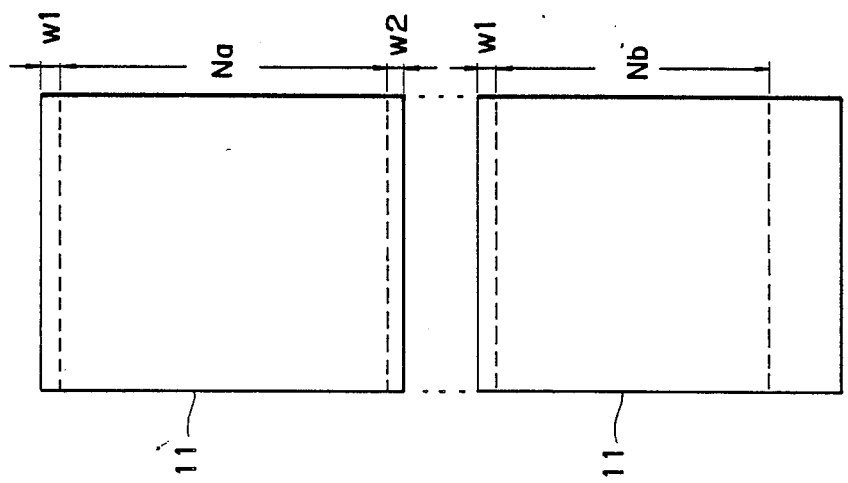
FIG. 4 is an illustration showing an output example of a report in accordance with the principle of one embodiment of the present invention.

Accordingly, a report is output and recorded on one or more cut sheets of recording paper 11 by the plotter 2 with each cut sheet recorded up to a predetermined maximum number of character lines and thus a character line defining part of the contents of the report is prevented from being recorded as divided between the two consecutive cut sheets of recording paper 11. FIG. 4 illustrates one example of output of such a report in accordance with the principle of the present invention. In this case, a report has been recorded on two cut sheets of recording paper 11 and the second cut sheet of recording paper 11 is recorded with Nb number of character lines with Nb being equal to or smaller than Na. As described above, in accordance with the principle of the present invention, the leading end margin w1 is provided at the leading end portion of each of the cut sheets of recording paper 11, and if there is a following page to be recorded, the trailing end margin w2 is also provided at the trailing end portion of the cut sheet of recording paper 11. As a result, in accordance with the present invention, a report is recorded properly at all times without losing any information and the recorded report is easy to read.

Figure 5:
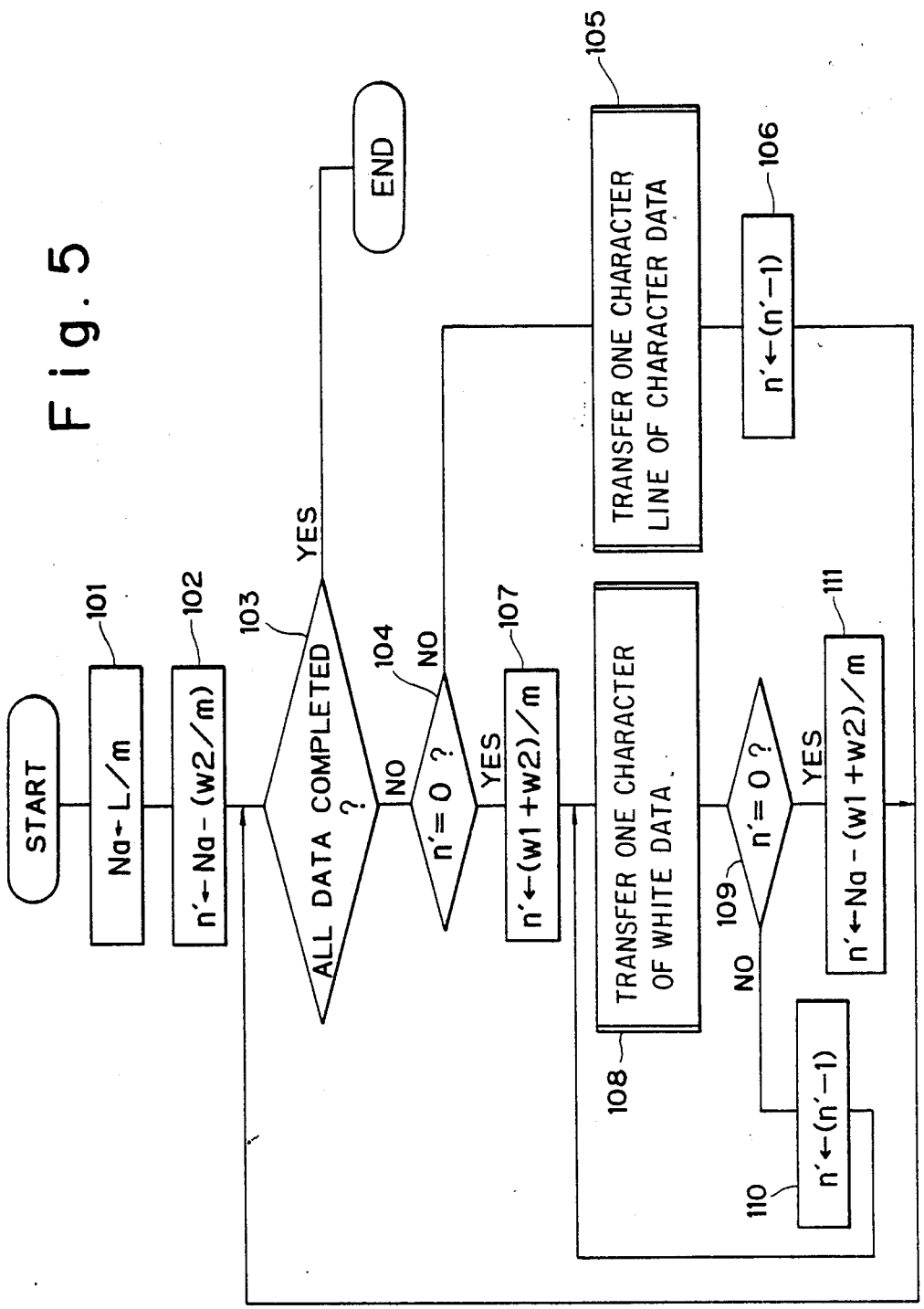
FIG. 5 is a flow chart showing a sequence of steps of a report output process in accordance with one embodiment of the present invention.

FIG. 5 illustrates an example of a process which is carried out by the system controller 3 during a report output. In the first place, the system controller 3 determines or calculates the maximum number Na of character lines which may be recorded on a single page or cut sheet of recording paper 11 (step 101) and then initializes a counter n' for storing the remaining number of character lines to be recorded (step 102). In step 101, it is to be noted that m=(m1+m2), which is equally applicable to the remaining steps. Then, it is examined whether or not the processing of all of the image data which constitutes a report has been completed (step 103), and if the result of determination at step 103 is NO, it is checked to see whether or not counter n' has become "0" (step 104). If the result of determination at step 104 is NO, one character line of data which constitutes part of the report is transferred to the plotter 2 in sequence (step 105) and it goes back to step 103 while decrementing counter n' (step 106).

If the result of determination at step 104 is YES, it indicates the condition in which the report is not fitted into the page in recording, and thus the count of counter n' is altered to the number of character lines equivalent to a sum of the trailing end margin w2 of the cut sheet of recording paper 11 in progress and the leading end margin w1 of the next following cut sheet of recording paper 11 (step 107). And then the process of transferring one character line of white data to the plotter 2 while decrementing the counter n' until the count of the counter n' reaches "0" is repetitively carried out (steps 108, 109 and 110). And, when the result of determination at step 109 is YES, it goes back to step 103 while altering the count of the counter n' to a number of character lines recordable on the next page. Such a process is repetitively carried out until the result of determination at step 103 becomes YES, and this process is completed when the result of determination at step 103 has become YES. Therefore, a report as shown in FIG. 4 and described above is output as recorded on one or more cut sheets of recording paper 11 by the plotter 2.

It is to be noted that in the above-described embodiment, the leading end margin w1 is provided at the leading end portion of each cut sheet of recording paper 11. In the above-described embodiment, the size of a graphic pattern/character (letter) is set at 7 dots in the horizontal direction and 9 dots in the vertical direction; however, the size of each character or graphic pattern may be set arbitrarily other than this. Normally, the characters which may be represented by a matrix of 7 dots (horizontal) by 9 dots (vertical) are so-called ANK characters, and in the case where kanji or Chinese characters are to be represented, a matrix of at least 16 dots (horizontal) by 16 dots (vertical) is required. It is to be noted that the present invention is equally applicable to such a situation. Besides, in the above-described embodiment, the present invention has been applied to a facsimile machine which uses a telephone network as a transmission line; however, the present invention is equally applicable to any other types of facsimile machines, such as Group 4 facsimile machines. Besides, as long as use is made of cut sheets of recording paper, use may be made of any other types of recording devices other than the above-described laser beam printer as the plotter of the present facsimile machine.

As described above, in accordance with the principle of the present invention, the maximum number of character lines which may be recorded on cut sheets of recording paper set in position in a recording device of a facsimile machine is first determined, and then a report of predetermined information regarding the operation of the facsimile machine is recorded on one or more of the cut sheets of recording paper, each up to the thus determined maximum number of character lines. And, thus, a report of predetermined parameters of information regarding the operation of the present facsimile machine, such as use history and set operating condition, may be properly output as recorded on one or more cut sheets of recording paper without loss of information.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A report outputting system of a facsimile machine which includes a recording device using cut sheets of recording paper set in the recording device for recording information thereon, said system comprising:
   means for determining a maximum number of character lines which may be recorded on each of said cut sheets of recording paper set in said recording device, said maximum number of character lines being determined with the provision of a predetermined leading end margin and a predetermined trailing end margin at the top and bottom of each of said cut sheets of recording paper;
   monitoring means for monitoring a number of character lines recorded on a cut sheet of recording paper by said recording device; and
   controlling means for controlling said recording device when said recording device records a report of predetermined information regarding an operation of said facsimile machine on one or more of said cut sheets of recording paper such that when said number of character, lines monitored by said monitoring means has reached said maximum number of character lines while said report is being recorded on one of said cut sheets of recording paper, the remaining portion of said report is recorded on one or more subsequent cut sheets of recording paper until all of said remaining portion of said report has been recorded.

2. The system of claim 1 wherein said recording device includes a laser beam printer.

3. The system of claim 1 further comprising detecting means for detecting a size of said cut sheets of recording paper set in said recording device wherein said determining means determines said maximum number of character lines which may be recorded on each of said cut sheets of recording paper based on the thus detected size.

4. The system of claim 1 wherein said monitoring means includes a counter which counts a number of character lines which can yet be recorded on a cut sheet of recording paper by said recording device, wherein said monitoring means monitors said number of character lines counted by said counter to determine said number of character lines recorded on a cut sheet of recording paper by said recording device.

* * * * *